Dec. 17, 1940.   B. A. DIGGINS   2,225,038
OPHTHALMIC MOUNTING AND METHOD OF ATTACHING SAME
Filed Jan. 21, 1938
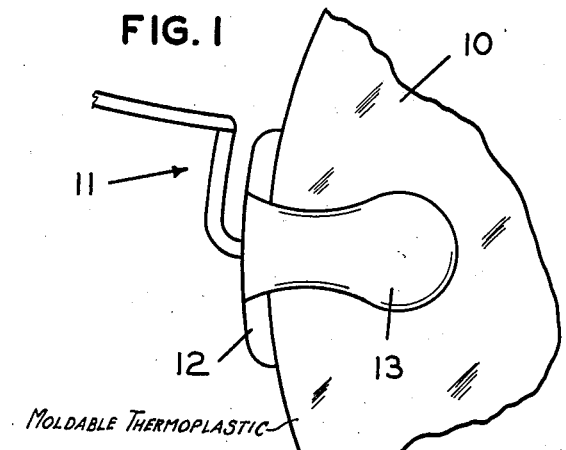
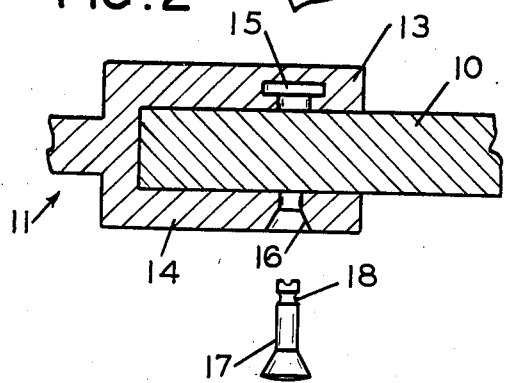
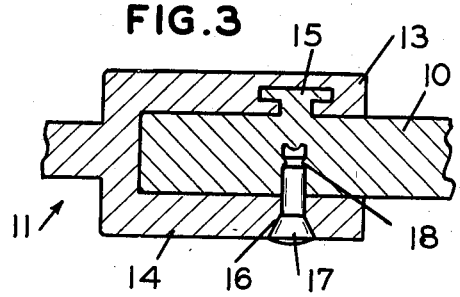
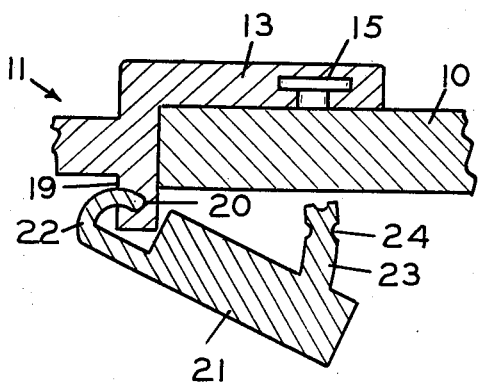
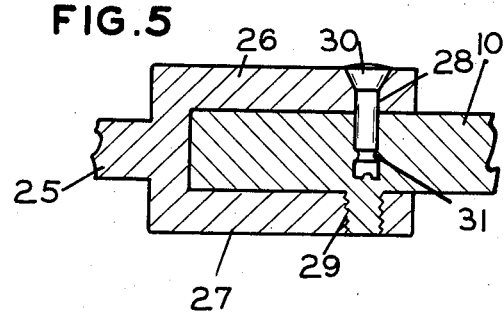
BARTHOLOMEW A. DIGGINS
*INVENTOR.*
BY *J.A. Ellestad*
ATTORNEY.

Patented Dec. 17, 1940

2,225,038

UNITED STATES PATENT OFFICE 2,225,038

OPHTHALMIC MOUNTING AND METHOD OF ATTACHING SAME

Bartholomew A. Diggins, Rochester, N. Y., assignor to Bausch & Lomb Optical Company, Rochester, N. Y., a corporation of New York Application January 21, 1938, Serial No. 186,182

8 Claims. (Cl. 88—47)

The present invention relates to eyeglasses and spectacles and more particularly to rimless mountings and methods of attaching same.

One of the objects of the present invention is to provide an improved ophthalmic mounting for lenses composed of moldable plastic material. Another object is to provide a new and improved method of attaching mountings on such lenses. A further object is to provide an ophthalmic mounting in which a lens of moldable plastic material is softened and pressed into locking engagement with said mounting. These and other objects and advantages reside in certain novel features of construction, arrangement and combination of parts and in steps and processes as will hereinafter be more fully set forth and pointed out in the appended claims.

Referring to the drawing:

Fig. 1 is a fragmentary front view of a lens and mounting assembled according to my invention.

Fig. 2 is a sectional view showing the arrangement of parts prior to assembly.

Fig. 3 is a sectional view showing the lens and mounting assembled.

Figs. 4 and 5 are sectional views of modifications.

A preferred embodiment of my invention is illustrated in Figs. 1 to 3 wherein 10 designates a lens to which is secured an ophthalmic mounting designated generally as 11. The lens 10 is composed of a transparent moldable material such as the polymerized derivatives of acrylic and methacrylic acids. Two such materials are sold under the trade names Plexiglas and Lucite. These materials are recited merely as examples and the invention is not limited to any particular materials. All that is required is that the lens 10 be formed of a thermoplastic transparent substance which is moldable at reasonably low temperatures and pressures.

The ophthalmic mounting 11 is formed with a shoe 12 for engaging the edge of the lens 10 and two spaced straps 13 and 14 for engaging the opposite sides of the lens 10. In the preferred embodiment shown in Figs. 1 to 3, the strap 13 is imperforate and has a locking means comprising an undercut recess 15 in its lens engaging surface. The strap 14 has an aperture 16 extending therethrough, in alignment with the recess 15.

In securing the mounting 11 to the lens 10, the lens 10 is heated in the locality of the mounting 11 and, as soon as the lens 10 becomes sufficiently soft, a finishing plug 17 is pressed through the aperture 16 into the lens 10. This forces the material of the lens 10 into the recess 15 as shown in Fig. 3. The finishing plug 17 is provided with a groove 18 and when the lens 10 is allowed to set, it hardens in this groove 18 and prevents withdrawal of the plug 17.

Suitable machines for assembling this mounting are disclosed in U. S. Patents 1,978,890 and 2,033,608 issued to S. E. Bouchard.

In the embodiment shown in Fig. 4, the mounting 11 has only the single strap 13. A projection 19 extends rearwardly from the mounting 11 and is provided with a recess 20. A strap 21 is formed with an extension 22 which engages releasably and pivotally in the recess 20 so that the strap 21 may be swung into contact with the surface of the lens 10. The strap 21 has a projection 23 opposite the recess 15 in the strap 13.

To secure the mounting of Fig. 4 to the lens 10, the lens 10 is softened in the locality of the mounting and the strap 21 is pressed into engagement with the surface of the lens 10. The projection 23 on the strap 21 forces the material of the lens 10 into the recess 15 and a groove 24 in the projection 23 becomes embedded in the lens 10 and locks the strap 21 in position.

Fig. 5 shows my invention as applied to a conventional screw mounting 25. This mounting 25 has two straps 26 and 27 engaging opposite sides of the lens 10. The strap 26 is provided with a countersunk aperture 28 and the strap 27 has a threaded aperture 29 in alignment with the aperture 28. As in the preceding embodiments, the lens 10 is softened in the locality of the mounting 25. A plug 30 is then inserted through the aperture 28 into the softened lens 10 forcing the material of the lens 10 into the aperture 29. The plug 30 has a groove 31 which becomes embedded in the lens 10.

From the foregoing, it will be apparent that I am able to attain the objects of my invention and provide a new and improved ophthalmic mounting and method of attaching same. The structural forms shown and described merely illustrate my invention of molding a thermoplastic ophthalmic lens into locking engagement with a mounting and various modifications can be made without departing from the spirit of my invention or the scope of the appended claims.

I claim:

1. In the method of making eyeglasses, the steps comprising, forming a lens of transparent moldable plastic material, placing on said lens an ophthalmic mounting having spaced straps for engaging opposite sides of the lens and having locking means on one of said straps, softening the lens in the locality of said locking means, pressing the lens into locking engagement with said locking means, and permitting said lens to harden.

2. In the method of making eyeglasses, the steps comprising, forming an ophthalmic lens of transparent, moldable plastic material, placing on said lens an ophthalmic mounting having spaced straps for engaging opposite sides of the lens, one of said straps being provided with locking means, and the other of said straps having an opening therethrough in alignment with said locking means, softening the lens in the locality of said straps, pressing a finishing plug into the opening to force the material of said lens into locking engagement with said locking means, and permitting said lens to harden with the finishing plug embedded therein.

3. In combination an ophthalmic lens formed of transparent moldable plastic material, an ophthalmic mounting, said mounting having two spaced straps one on each side of said lens, locking means on one of said straps, the material of said lens extending into locking engagement with said locking means, and a projection extending from the other strap embedded in said lens.

4. An ophthalmic lens composed of transparent moldable plastic material, and an ophthalmic mounting, said mounting having two spaced straps, one on each side of said lens, one of said straps having an undercut recess in its lens engaging face, said lens being pressed into locking engagement in said recess.

5. In combination, an ophthalmic lens formed of transparent plastic material, an ophthalmic mounting, said mounting having a strap engaging one surface of said lens and anchoring means having an end portion and a neck portion smaller than the end portion on said strap, said lens being deformed into intimate contact with said anchoring means and engaging in said portions.

6. In combination, an ophthalmic lens composed of transparent plastic material, an ophthalmic mounting, said mounting having two spaced straps one on each side of said lens, and a locking element having a reentrant portion on one of said straps, said locking element being embedded in said lens with the material of said lens engaging in said reentrant portion.

7. In combination, an ophthalmic lens composed of a transparent plastic material, an ophthalmic mounting having a strap extending along one surface of said lens, and a projection having an enlarged end fixed on said strap, said projection being embedded in said lens with the material of the lens conforming to and in intimate contact with said projection and enveloping said enlarged end.

8. In the art of securing an ophthalmic lens of transparent moldable material in an ophthalmic mounting of the type having lens engaging straps and anchoring means on one of the straps, the steps comprising heating the lens in the locality of the straps, deforming the lens until it encases and is in intimate contact with said anchoring means and permitting said lens to harden.

BARTHOLOMEW A. DIGGINS.